United States Patent
Nun et al.

(10) Patent No.: US 7,211,313 B2
(45) Date of Patent: *May 1, 2007

(54) SURFACES RENDERED SELF-CLEANING BY HYDROPHOBIC STRUCTURES AND A PROCESS FOR THEIR PRODUCTION

(75) Inventors: Edwin Nun, Billerbeck (DE); Markus Oles, Hattingen (DE); Bernhard Schleich, Recklinghausen (DE)

(73) Assignee: Degussa AG, Duesseldorf (DE)

( * ) Notice: Subject to any disclaimer, the term of this patent is extended or adjusted under 35 U.S.C. 154(b) by 155 days.

This patent is subject to a terminal disclaimer.

(21) Appl. No.: 10/137,445

(22) Filed: May 3, 2002

(65) Prior Publication Data

US 2003/0013795 A1   Jan. 16, 2003

(30) Foreign Application Priority Data

Jul. 16, 2001   (DE) ................................ 101 34 477

(51) Int. Cl.
*D06N 7/04* (2006.01)
*C08K 9/04* (2006.01)

(52) U.S. Cl. ...................... 428/143; 428/144; 428/145; 428/147; 428/323; 427/180; 523/205; 523/210; 523/216; 523/220; 523/300; 524/430; 524/442; 524/492; 524/493

(58) Field of Classification Search ............... 523/220, 523/300, 221, 202, 204, 205, 210, 216, 217; 522/83, 91, 96, 99, 109, 144, 148, 149, 162; 524/445, 442, 430–437, 493, 500, 588, 590; 428/422, 447, 451, 461, 515, 516, 143
See application file for complete search history.

(56) References Cited

U.S. PATENT DOCUMENTS

| | | | |
|---|---|---|---|
| 3,354,022 A | | 11/1967 | Dettre et al. |
| 5,093,130 A | * | 3/1992 | Fujii et al. .................. 424/463 |
| 5,599,489 A | | 2/1997 | Saiki et al. |
| 6,020,419 A | * | 2/2000 | Bock et al. .................. 524/590 |

(Continued)

FOREIGN PATENT DOCUMENTS

DE   199 17 367   10/2000

(Continued)

OTHER PUBLICATIONS

Wypych, George. Handbook of Fillers, 2nd Edition. Toronto, Plastics Design Library, 2000, pp. 132, 139. TP1114.W96.*

(Continued)

*Primary Examiner*—Vasu Jagannathan
*Assistant Examiner*—Vickey Ronesi
(74) *Attorney, Agent, or Firm*—Oblon, Spivak, McClelland, Maier & Neustadt, P.C.

(57) ABSTRACT

A self-regenerating, self-cleaning hydrophobic surface is formed when particles are secured on a carrier that is itself a mixture of particles and binder. When particles on the surface are ablated by erosion, new particles in the carrier are exposed to regenerate the self-cleaning surface, resulting in a long-lasting self-cleaning action. The self-cleaning surface may be used with particular advantage outdoors, e.g. on vehicles, where self-cleaning materials are particularly exposed to the effects of the environment.

26 Claims, 1 Drawing Sheet

U.S. PATENT DOCUMENTS

| | | | |
|---|---|---|---|
| 6,093,754 | A | 7/2000 | Lambert et al. |
| 6,660,363 | B1 * | 12/2003 | Barthlott .................... 428/141 |
| 6,683,126 | B2 * | 1/2004 | Keller et al. ................ 524/492 |
| 6,858,284 | B2 * | 2/2005 | Nun et al. ................... 428/149 |
| 6,977,094 | B2 | 12/2005 | Oles et al. |
| 2002/0084553 | A1 | 7/2002 | Nun et al. |
| 2002/0148601 | A1 * | 10/2002 | Roos et al. ................. 165/164 |
| 2002/0150723 | A1 * | 10/2002 | Oles et al. ................. 428/143 |
| 2002/0150724 | A1 * | 10/2002 | Nun et al. ................... 428/143 |
| 2002/0150725 | A1 * | 10/2002 | Nun et al. ................... 428/143 |
| 2002/0150726 | A1 * | 10/2002 | Nun et al. ................... 428/143 |
| 2002/0164443 | A1 * | 11/2002 | Oles et al. ................. 428/35.7 |
| 2002/0192385 | A1 * | 12/2002 | Jenkner et al. ............. 427/387 |
| 2003/0013795 | A1 * | 1/2003 | Nun et al. ................... 524/442 |
| 2003/0108716 | A1 | 6/2003 | Nun et al. |
| 2003/0134086 | A1 | 7/2003 | Nun et al. |
| 2003/0147932 | A1 * | 8/2003 | Nun et al. ................... 424/405 |
| 2004/0023798 | A1 * | 2/2004 | Kaibel et al. ............... 502/325 |
| 2004/0154106 | A1 | 8/2004 | Oles et al. |
| 2005/0084653 | A1 | 4/2005 | Nun et al. |
| 2005/0103457 | A1 | 5/2005 | Nun et al. |
| 2005/0112326 | A1 | 5/2005 | Nun et al. |
| 2005/0118433 | A1 | 6/2005 | Oles et al. |
| 2005/0163951 | A1 | 7/2005 | Oles et al. |
| 2005/0167877 | A1 | 8/2005 | Nun et al. |
| 2005/0205830 | A1 | 9/2005 | Oles et al. |
| 2005/0208269 | A1 | 9/2005 | Nun et al. |
| 2005/0227045 | A1 | 10/2005 | Oles et al. |
| 2005/0253302 | A1 | 11/2005 | Nun et al. |
| 2006/0049376 | A1 | 3/2006 | Nun et al. |
| 2006/0128239 | A1 | 6/2006 | Nun et al. |
| 2006/0141223 | A1 | 6/2006 | Oles et al. |
| 2006/0147675 | A1 | 7/2006 | Nun et al. |
| 2006/0156475 | A1 | 7/2006 | Oles et al. |
| 2006/0172641 | A1 | 8/2006 | Hennige et al. |
| 2006/0222815 | A1 | 10/2006 | Oles et al. |

FOREIGN PATENT DOCUMENTS

| | | |
|---|---|---|
| DE | 199 44 169 | 3/2001 |
| DE | 19944169 A1 * | 3/2001 |
| EP | 1 040 874 | 10/2000 |
| EP | 1 249 280 | 10/2002 |
| FR | 2 792 003 | 10/2000 |
| JP | 11302561 A * | 11/1999 |
| WO | WO 96/04123 | 2/1996 |
| WO | WO 00/58410 | 10/2000 |
| WO | WO 00/63312 | 10/2000 |

OTHER PUBLICATIONS

English-Language translation of JP 11-302561, Nov. 2, 1999.*
H. Saito, et al., Surface Coatings International, vol. 4, pp. 166-171, "Water-and Ice-Repellent Coatings," 1997.
F. Burmeister, et al., Physikalische Blaetter, vol. 56, No. 4, pp. 49-51, "Mit Kapillarkraeften Zu Nanostrukturen," 2000.
H. Hattori, Advanced Materials, vol. 13, No. 1, pp. 51-54, "Anti-Reflection Surface With Particle Coating Deposited by Electrostatic Attraction," Jan. 5, 2001.
A. Nakajima, et al., Langmuir, pp. 16-17, "Transparent Super-Hydrophobic Thin Films With Self-Cleaning Property," 2001.
Pending U.S. Appl. No. 09/241,077, filed Feb. 1, 1999.
Pending U.S. Appl. No. 09/537,393, filed Mar. 29, 2000.
Pending U.S. Appl. No. 09/692,428, filed Oct. 20, 2000.
Pending U.S. Appl. No. 09/926,401, filed Mar. 4, 2000.
Pending U.S. Appl. No. 09/926,504, filed Mar. 30, 2000.
Pending U.S. Appl. No. 10/069,562, filed Jul. 17, 2000.
Pending U.S. Appl. No. 10/111,407, filed Oct. 31, 2000.
U.S. Appl. No. 10/551,841, filed Oct. 3, 2005, Nun et al.
U.S. Appl. No. 10/546,979, filed Aug. 26, 2005, Nun et al.

* cited by examiner

SURFACES RENDERED SELF-CLEANING BY HYDROPHOBIC STRUCTURES AND A PROCESS FOR THEIR PRODUCTION

BACKGROUND OF THE INVENTION

1. Field of the Invention

The present invention relates to self-cleaning surfaces and to a process for their production. In particular, the present invention relates to self-cleaning surfaces that remain self-cleaning for prolonged periods of time despite natural erosion.

2. Discussion of the Background

Articles with surfaces that are extremely difficult to wet have a number of commercially significant features. The feature of most commercial significance here is the self-cleaning action of low-wettability surfaces, since the cleaning of surfaces is time-consuming and expensive. Self-cleaning surfaces are therefore of very great commercial interest. The mechanisms of adhesion are generally the result of surface-energy-related parameters relating to interaction of the two surfaces that are in contact. The systems generally attempt to reduce their free surface energy. If the free surface energies between two components are intrinsically very low, it can generally be assumed that there will be weak adhesion between these two components. The important factor here is the relative reduction in free surface energy. In pairings where one surface energy is high and one surface energy is low the crucial factor is very often the opportunity for interactive effects. For example, when water is applied to a hydrophobic surface it is impossible to bring about any noticeable reduction in surface energy. This is evident in that the wetting is poor. The water applied forms droplets with a very high contact angle. Perfluorinated hydrocarbons, e.g. polytetrafluoroethylene, have very low surface energy. There are hardly any components that adhere to surfaces of this type, and components deposited on surfaces of this type are in turn very easy to remove.

The use of hydrophobic materials, such as perfluorinated polymers, for producing hydrophobic surfaces is known. A further development of these surfaces consists in structuring the surfaces in the μm to nm range. U.S. Pat. No. 5,599,489 discloses a process in which a surface can be rendered particularly repellent by bombardment with particles of an appropriate size, followed by perfluorination. Another process is described by H. Saito et al. in "Surface Coatings International" April 1997, pp. 168 et seq. Here, particles made from fluoropolymers are applied to metal surfaces, whereupon a marked reduction was observed in the wettability of the resultant surfaces with respect to water, with a considerable reduction in tendency toward icing.

U.S. Pat. No. 3,354,022 and WO 96/04123 describe other processes for reducing the wettability of articles by topological alterations in the surfaces. Here, artificial elevations or depressions with a height of from about 5 to 1000 μm and with a separation of from about 5 to 500 μm are applied to materials which are hydrophobic or are hydrophobicized after the structuring process. Surfaces of this type lead to rapid droplet formation, and as the droplets roll off they absorb dirt particles and thus clean the surface.

This principle has been borrowed from the natural world. Small contact areas reduce Van der Waal's interaction, which is responsible for adhesion to flat surfaces with low surface energy. For example, the leaves of the lotus plant have elevations made from a wax, and these elevations lower the contact area with water. WO 00/58410 describes these structures and claims the formation of the same by spray-application of hydrophobic alcohols, such as 10-nonacosanol, or of alkanediols, such as 5,10-nonacosanediol. The separations of the elevations in the structures are in the range from 0.1 to 200 μm and the heights of the elevations are from 0.1 to 100 μm. However, no information is given concerning the shape of the elevations. A disadvantage here is that the self-cleaning surfaces lack stability, since the structure is removed by detergents.

Another method of generating easy-clean surfaces has been described in DE 199 17 367 A1. However, the coatings, based on fluorine-containing condensates, are not self-cleaning. Although there is a reduction in the area of contact between water and the surface, this is insufficient.

EP 1 040 874 A2 describes the embossing of microstructures and claims the use of structures of this type in analysis (microfluidies). A disadvantage of these structures is their unsatisfactory mechanical stability.

Processes for producing the structured surfaces are likewise known. Besides the precision-casting reproduction of these structures by way of a master structure, by injection molding, or by embossing processes, there are other known processes which utilize the application of particles to a surface, e.g. in U.S. Pat. No. 5,599,489. Common features of all casting processes are that the self-cleaning behavior of the surfaces can be described by way of a very high aspect ratio, and that the structures have three-dimensional periodicity.

High aspect ratios in three-dimensional space, i.e. objects which are tall and narrow and stand in isolation, are difficult to produce industrially and have low mechanical stability.

There has been much relatively recent work concerned with the three-dimensional structuring of surfaces, an example being U.S. Pat. No. 6,093,754, where a three-dimensional structure is achieved by way of multiple printing of the surface, some of the printing inks repelling the next layer so that a structure is formed.

C. Bernard and D. Lebellac describe in FR 2792003 A1 a process for producing structured surfaces which are both water-repellent and oil-repellent, by way of vacuum deposition, using a CVD technique. These layers, too, have insufficient mechanical stability.

Reducing the aspect ratio generally also increases the stability of the layers. For example, in "Physikalische Blätter" 56 (2000), No. 4, 49 et seq. Frank Burmeister describes a process for obtaining nanostructures by means of capillary forces. It is emphasized that structures from a few atomic layers up to the particle radius can be varied in such a way that it is also possible to generate structures with an aspect ratio>1. However, it is also emphasized that processes of this type are only useable for relatively small areas, since otherwise stress cracks can form in the drying process.

In "Advanced Materials", 2001, 13, No. 1, pp. 51 et seq., Hideshi Hattore describes a process for electrostatic coating, emphasizing that self-organization of the particles occurs if the surface to be coated and the particles themselves carry opposite electrical charges. However this process does not generate aspect ratios>1, and these layers are therefore merely antireflection layers.

An interesting process for generating self-cleaning surfaces is described by Akira Nakajima, Langmuir 2000, 16, 5754–5760, where the structure is generated by subliming aluminum acetylacetonate. 2% of titanium dioxide also has to be added to the hydrophobic material in order to achieve self-cleaning properties. The cause of the effect here is certain to be the catalytic decomposition properties of the titanium dioxide in combination with light, rather than the structure and the hydrophobic properties.

DE 101 18 351 and DE 101 18 352 say that stable self-cleaning surfaces can be obtained by securing structure-formers having a fissured structure. If use is made here of hydrophobic structure-formers and hydrophobic carrier materials, these surfaces are to some degree mechanically stable and to some degree resistant to erosion by wind, weather and light. However, it is impossible to avoid ablation of the active layers, in particular when damage is caused by UV light. As is generally the case, attack by wind and weather leads to gradual smoothing of the surface and thus to fall-off in the self-cleaning effect. The self-cleaning action falls away asymptotically. The limiting value reached is dependent on the amount of residual structure remaining on the carrier, and the extent of hydrophobic properties and smoothness possessed by the resultant surface.

DE 199 44 169 A1 achieves self-cleaning surfaces by way of incipient erosion of an "outer layer". In this process, the effect does not appear until erosion has occurred. Further erosion causes the self-cleaning effect to reduce or disappear entirely. There is no regeneration of the self-cleaning surface.

SUMMARY OF THE INVENTION

It was therefore an object of the present invention to provide coatings with surface structures that have high mechanical stability and that self-clean by way of the movement of water, even after natural erosion has occurred, and also to provide a simple process for producing these self-cleaning surfaces.

Surprisingly, it has been found that surface structures that also have a structure-former in the carrier have a regenerative effect. Although erosion ablates some of the structure-forming particles, it also releases from the carrier new particles that have activity for the self-cleaning effect, thus resulting in self-regeneration of the self-cleaning effect.

The present invention therefore provides a self-cleaning surface with a self-regenerating self-cleaning effect, and having an artificial, at least to some extent hydrophobic, surface structure made from elevations and depressions, where the elevations and depressions are formed by particles secured to the surface by means of a carrier, wherein the carrier is a mixture made from particles and binder.

The present invention also provides a process for producing self-cleaning surfaces, by achieving a suitable, at least to some extent hydrophobic, surface structure on a surface by securing particles by means of a carrier, wherein the carrier used comprises a mixture of particles and binder.

BRIEF DESCRIPTION OF THE DRAWINGS

The preferred embodiments of the invention will be described in detail, with reference to the following figures, wherein.

DETAILED DESCRIPTION OF PREFERRED EMBODIMENTS

Figure 1:
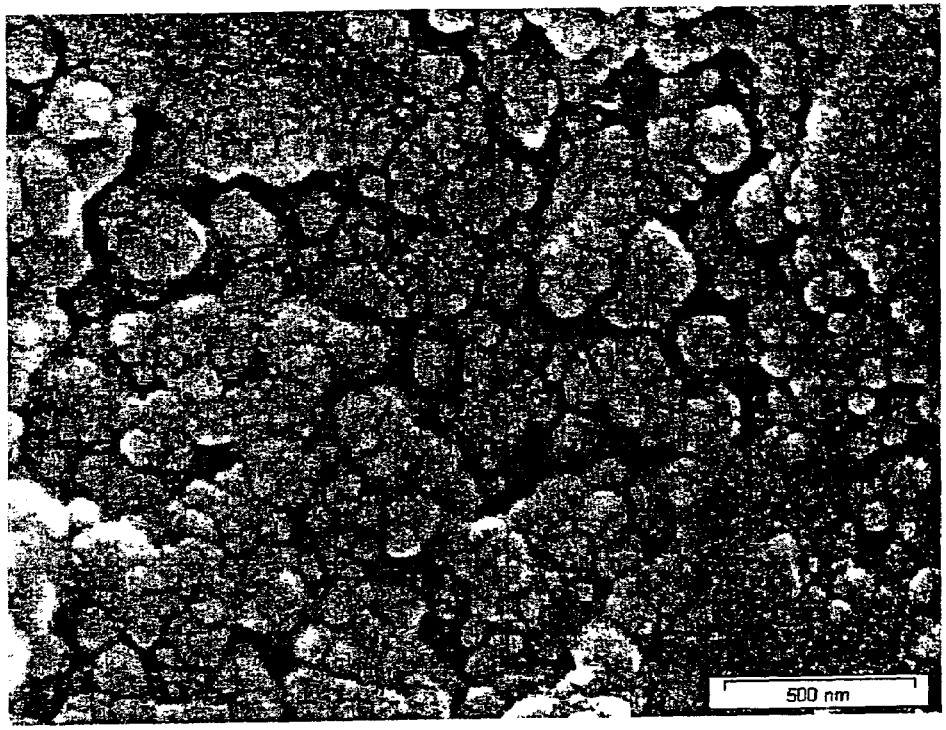
FIG. 1 is a scanning electron micrograph (SEM) of a carrier system with a self-regenerating self-cleaning effect.

For the purposes of the present invention, a self-cleaning effect is an effect which renders it more difficult to wet surfaces. The poor wettability of the surfaces, in particular by water, removes contamination, e.g. dust, from the surface by way of roll-off of liquid droplets. The liquid may be rain, for example.

The process of the invention has the advantage that the surface coating systems (carriers) produced by intimate incorporation of structure-forming materials (particles) into a binder system have a) excellent adhesion to the surface and b) excellent adhesion to the particles also applied. This method gives self-cleaning surfaces in which new structure-forming particles are released by erosion that occurs naturally by way of UV light and the effects of wind and weather, the result being self-regeneration of what is called the lotus effect. With the process of the invention it is unnecessary for the structure-former to be dispersed without any agglomerates in the carrier, as demanded by U.S. Pat. No. 6,020,419. On the contrary, agglomerates in the carrier are desirable in the present invention, since agglomerates have appropriately advantageously structured surfaces, the agglomerates being particles in the size range<50 µm and complying with the descriptions in DIN 53206. Since the use of agglomerates is also possible, and there is no need for the complicated process of breaking down the agglomerates, the cost for producing self-cleaning surfaces by the process of the invention is substantially lower.

The self-regenerating self-cleaning effect gives the self-cleaning surfaces of the invention particularly high suitability for applications in an aggressive environment, in particular for open-air application. In the case of prior art self-cleaning surfaces, the effects of weathering and the environment cause relatively rapid impairment of the self-cleaning properties, e.g. by way of erosion, since erosion removes the surface structure responsible for the self-cleaning properties. In the case of the surfaces of the invention, the self-cleaning effect self-regenerates, since although particles are ablated by erosion, new particles come to prominence from the carrier, likewise ablated. Depending on the thickness of the carrier layer and on the number of particles present therein, the self-cleaning effect is retained substantially longer on the surfaces of the invention than is the case with conventional self-cleaning surfaces.

Substances used for securing particles on a surface are hereinafter termed carriers.

In the inventive self-cleaning surface with a self-regenerating self-cleaning effect, and having an artificial, at least to some extent hydrophobic, surface structure made from elevations and depressions, where the elevations and depressions are formed by particles secured to the surface by means of a carrier, the carrier is a mixture made from particles and binder.

The particles may be particles in the sense of DIN 53 206. According to that standard, particles may be separated particles or else aggregates or agglomerates, where, according to DIN 53 206, aggregates have primary particles in edge- or surface-contact, while agglomerates have primary particles in point-contact. The particles used may also be those formed by combining primary particles to give agglomerates or aggregates. The structure of these particles may be spherical, strictly spherical, moderately aggregated, almost spherical, extremely highly agglomerated, or porous-agglomerated. The preferred size of the agglomerates or aggregates is from 20 nm to 100 µm, particularly preferably from 0.2 to 30 µm.

The particles which form the structure preferably have a fissured structure with elevations and/or depressions in the nanometer range. The average height of the elevations is preferably from 20 to 500 nm, particularly preferably from 50 to 200 nm. The separation of the elevations and, respectively, depressions on the particles is preferably below 500 nm, very particularly preferably below 200 nm.

The fissured structures with elevations and/or depressions in the nanometer range may be formed by cavities, pores, grooves, peaks and/or protrusions, for example. The particles themselves have an average size of less than 50 μm, preferably less than 30 μm, and very particularly preferably less than 20 μm. The separations of the particles on the surface are preferably from 0 to 10 particle diameters, in particular from 0 to 3 particle diameters.

The particles preferably have a BET surface area of from 50 to 600 square meters per gram, and very particularly preferably from 50 to 200 m$^2$/g.

The structure-forming particles used may be formed from a very wide variety of compounds from a large number of fields of chemistry. The particles preferably comprise at least one material selected from the group consisting of silicates, doped silicates, minerals, metal oxides, silicas, polymers, and silica-coated metal powders. The particles very particularly preferably comprise fumed silicas or precipitated silicas, in particular Aerosils®. $Al_2O_3$, $SiO_2$, $TiO_2$, $ZrO_2$, zinc powder coated with Aerosil R 974®, and preferably having a particle size of from 1 μm, or pulverulent polymers, e.g. cryogenically milled or spray-dried polytetrafluoroethylene (PTFE), or perfluorinated copolymers, or copolymers with tetrafluoroethylene.

The particles for generating the self-cleaning surfaces preferably have hydrophobic properties, besides the fissured structures. The particles may themselves be hydrophobic, e.g. particles comprising PTFE, or the particles used may have been hydrophobicized. Hydrophobicizing the particles may include reacting the particles with a hydrophobicizing agent. The hydrophobicization of the particles may take place in a manner known to the skilled worker. Examples of typical hydrophobicized particles are very fine powders, such as Aerosil R 8200® (Degussa AG), these materials being commercial available.

The silicas whose use is preferred preferably have a dibutyl phthalate adsorption, based on DIN 53 601, of from 100 to 350 ml/100 g, preferably from 250 to 350 ml/100 g.

The particles are secured to the surface by means of a carrier. Applying the particles to the surface in a tightly packed layer permits the self-cleaning surface to be generated. According to the invention, the carrier comprises a mixture made from binder and particles, and these particles may be the abovementioned particles. The mixture made from binder and particles preferably comprises from 1 to 50% by weight, particularly preferably from 5 to 25% by weight, and very particularly preferably from 7.5 to 15% by weight, of particles, based on the mixture.

For the purposes of the present invention, binders are surface coatings or surface coating systems, or adhesives or adhesive systems. In principle, any surface coating system or adhesive system may be used as binder.

In one preferred embodiment of the self-cleaning surface of the invention, the binder is a surface coating cured by means of thermal energy and/or the energy in light, or a two-component surface coating system, or some other reactive surface coating system, the curing preferably taking place by polymerization or crosslinking. The cured surface coating particularly preferably comprises polymers and/or copolymers made from mono- and/or polyunsaturated acrylates and/or methacrylates. The mixing ratios may be varied within wide limits. It is also possible for the cured surface coating to comprise compounds having functional groups, e.g. hydroxyl groups, epoxy groups, or amine groups, or fluorine-containing compounds, e.g. perfluorinated acrylic esters. This is advantageous in particular when the compatibilities of surface coating and hydrophobic particles are balanced with respect to one another, as is the case, for example, using N-{2-(acryloyloxy)ethyl-}-N-ethylperfluorooctane-1-sulfonamide with Aerosil R8200®. The surface coatings that may be used are not only surface coatings based on acrylic resin but also surface coatings based on polyurethane, and also surface coatings which comprise polyurethane acrylates or silicone acrylates.

The self-cleaning surfaces of the invention have a roll-off angle of less than 20°, particularly preferably less than 10°, the definition of the roll-off angle being such that a water droplet rolls off when applied from a height of 1 cm to a flat surface resting on an inclined plane. The advancing angle and the receding angle are above 140°, preferably above 150°, and have less than 15° hysteresis, preferably less than 10°. Particularly good self-cleaning surfaces are obtainable when the surfaces of the invention have an advancing and receding angle above at least 140°, preferably above 150°.

Depending on the binder used and on the size and material of the particles used, it is possible to achieve semitransparent self-cleaning surfaces. In particular, the surfaces of the invention may be contact-transparent, i.e. when a surface of the invention is produced on an article on which there is writing, this writing remains legible if its size is adequate.

To allow self-regeneration of the self-cleaning effect to be achieved, it is necessary for there to be differences in the properties of the material used for the particles and for the binder. The differences may be mechanical, physical, or else chemical in nature. To achieve self-regeneration it is important that the binder is ablated (whether chemically, mechanically, or physically) more rapidly than the particles present therein. In relation to mechanical stability, therefore, it is preferable that the hardness of the particles is greater than the hardness of the binder used, by 10%, preferably 20%, and very particularly preferably 50%. In this way the ablation achieved by abrasion of the binder lying on the surface is more rapid than that of the particles, and when a particle is lost new particles come to prominence from the binder and replace those lost. Depending on the environmental factors to which the surface of the invention is exposed, the properties of the materials may be optimized by selection and combination of the binder used and the particles used.

Different UV resistance of particle and binder can bring about an effect of just this type. Particles such as Aerosils® have unlimited UV resistance. However, the UV light can be transmitted through the particles to the binder layer, and may cause damage to the binder, which frequently comprises a polymer matrix. The result is that over time the adhesion of the structure-forming particles is weakened, and possibly that the particle is released from the carrier. The surface is temporarily exposed to the UV light at this location. This then attacks the organic compounds of the binder in the usual way. However, degradation of the corresponding polymer chains releases new particles at the surface, and these are structure-formers that again ensure that the surface has self-cleaning properties.

Although particles made from quartz (Aerosils®) have high UV transmittance, only very little UV radiation reaches the polymeric carrier matrix through the particles, since the particles have numerous angled surfaces and the associated light scattering means that only a small part of the UV radiation penetrates the particles.

The self-cleaning surfaces of the invention are preferably produced by the process of the invention for producing these surfaces. In the inventive process for producing self-cleaning surfaces by achieving a suitable, at least to some extent hydrophobic, surface structure on a surface by securing particles by means of a carrier, the carrier used comprises a mixture of particles and binder.

The particles used preferably comprise at least one material selected from the group consisting of silicates, doped silicates, minerals, metal oxides, silicas, and polymers. The particles very particularly preferably comprise fumed silicates or silicas, in particular Aerosils®, minerals such as magadiit, $Al_2O_3$, $SiO_2$, $TiO_2$, $ZrO_2$, zinc powder coated with Aerosil R 974®, or pulverulent polymers, e.g. cryogenically milled or spray-dried polytetrafluoroethylene (PTFE).

Particular preference is given to the use of particles with a BET surface area of from 50 to 600 $m^2/g$. Very particular preference is given to the use of particles which have a BET surface area of from 50 to 200 $m^2/g$.

The particles for generating the self-cleaning surfaces preferably have hydrophobic properties, besides the fissured structures. The particles may themselves be hydrophobic, e.g. particles comprising PTFE, or the particles used may have been hydrophobicized. The hydrophobicization of the particles may take place in a manner known to the skilled worker. Examples of typical hydrophobicized particles are very fine powders, such as Aerosil R 974® or Aerosil R 8200® (Degussa AG), these materials being commercially available.

The process of the invention preferably comprises the steps of
a) applying a mixture of binder and particles as carrier to a surface,
b) applying particles which comprise fissured structures to the carrier, and
c) securing the particles by curing the carrier.

Examples of methods of applying the mixture are the use of a spray, a doctor blade, a brush, or a jet. The mixture is preferably applied at a thickness of from 1 to 200 µm. with preference at a thickness of from 5 to 100 µm, and very particularly preferably at a thickness of from 25 to 50 µm. Depending on the viscosity of the mixture, it may be advantageous to allow the mixture to undergo some extent of curing or of drying prior to application of the particles. The viscosity of the mixture is ideally selected in such a way that the particles applied can sink into the mixture at least to some extent, but in such a way as to prevent flow of the mixture and, respectively, of the particles applied thereto when the surface is placed vertically.

The particles may be applied by commonly used processes, such as spray application or powder application. In particular, the particles may be applied by spray application using an electrostatic spray gun. Once the particles have been applied, excess particles, i.e. particles not adhering to the mixture, may be removed from the surface by shaking, or by being brushed off or blown off. These particles may be collected and reused.

The binder used in the carrier may be a surface coating or a surface coating system, or an adhesive or an adhesive system. It is preferable for the binder used to comprise a surface coating system or surface coating which at least comprises a mixture made from mono- and/or polyunsaturated acrylates and/or methacrylates. The mixing ratios may be varied within wide limits. The binder used particularly preferably comprises a surface coating which can be cured by means of thermal or chemical energy, and/or the energy in light.

If the particles used have hydrophobic properties, the binder selected preferably comprises a surface coating or a surface coating system which has hydrophobic properties.

It can be advantageous for the mixtures used as surface coating for the binder to comprise compounds having functional groups, e.g. hydroxyl groups, epoxy groups, or amine groups, or fluorine-containing compounds, e.g. perfluorinated acrylic esters. This is advantageous in particular when the compatibilities (relating to the hydrophobic properties) of the surface coating and hydrophobic particles are balanced with respect to one another, as is the case, for example, using N-{2-(acryloyloxy)ethyl}-N-ethylperfluorooctane-1-sulfonamide with Aerosil VPR 411®. The surface coatings that may be used as binder are not only surface coatings based on acrylic resin but also surface coatings based on polyurethane, and also surface coatings that comprise polyurethane acrylates. Two-component surface coating systems or other reactive surface coating systems may also be used as binder.

To prepare the mixture made from binder and particles and used as carrier, the binder is intimately and thoroughly mixed with the particles. The mixing may take place in a manner known to the skilled worker.

The particles are secured to the carrier by curing the carrier, preferably by way of thermal and/or chemical energy, and/or the energy in light, depending on the surface coating system used. The curing of the carrier, initiated by chemical or thermal energy, and/or the energy in light, may take place by polymerization or crosslinking of the constituents of the surface coatings or, respectively, surface coating systems, for example. It is particularly preferable for the curing of the carrier to take place by way of the energy in light, and it is very particularly preferable for the polymerization of the carrier to take place by way of the light in the UV region from a medium-pressure mercury lamp. It is preferable for the curing of the carrier to take place in an inert gas atmosphere, very particularly preferably in a nitrogen atmosphere.

Depending on the thickness of the curable substance applied and the diameter of the particles used, it can be necessary to restrict the time that expires between application of the particles and curing of the carrier, in order to avoid complete immersion of the particles in the carrier. It is preferable for the carrier to be cured within from 0.1 to 10 min, preferably within from 1 to 5 min, after application of the particles.

In carrying out the process of the invention it can be advantageous to use particles which have hydrophobic properties, and/or particles which have hydrophobic properties as a result of treatment with at least one compound selected from the group consisting of the alkylsilanes, alkyldisilazanes, and perfluoroalkylsilanes. The hydrophobicization of particles is known, and an example of a description is found in the Degussa AG series of publications Pigmente (Pigments), Number 18.

It can also be advantageous for the particles to be given hydrophobic properties after the process of securing to the carrier. One way in which this may take place is that the particles of the treated surface are given hydrophobic properties by way of treatment with at least one compound selected from the group consisting of the alkylsilanes and the perfluoroalkylsilanes, e.g. those which can be purchased from Degussa AG. The preferred method of treatment is that the surface which comprises particles and which is to be hydrophobicized is dipped into a solution which comprises a hydrophobicizing reagent, e.g. alkylsilanes, excess hydrophobicizing reagent is allowed to drip off, and the surface is annealed at the highest possible temperature. The maximum temperature that may be used is limited by the softening point of the carrier or substrate.

The process of the invention gives excellent results when used for producing self-cleaning surfaces with a self-regenerating self-cleaning effect on planar or non-planar articles. in particular on non-planar articles. This is possible to only a limited extent with conventional processes. In particular. non-planar articles. e.g. sculptures. are inaccessible or only accessible to a limited extent when using processes which apply prefabricated films to a surface or processes intended to produce a structure by embossing. However, the process of the invention may, of course, also be used to produce self-cleaning surfaces with a self-regenerating self-cleaning effect on articles with planar surfaces. e.g. greenhouses or public conveyances. The use of the process of the invention for producing self-cleaning surfaces on greenhouses has particular advantages, since the process can also produce self-cleaning surfaces on transparent materials, for example, such as glass or Plexiglas®. and the self-cleaning surface can be made transparent at least to the extent that the amount of sunlight that can penetrate the transparent surface equipped with a self-cleaning surface is sufficient for the growth of the plants in the greenhouse. Greenhouses having a surface of the invention can be operated with intervals between cleaning that are longer than for conventional greenhouses, which have to be cleaned regularly to remove leaves, dust, lime, and biological material, e.g. algae.

The process of the invention can also be used for producing self-cleaning surfaces with a self-regenerating self-cleaning effect on non-rigid surfaces of articles, e.g. umbrellas or on other surfaces required to be flexible. The process of the invention may very particularly preferably be used for producing self-cleaning surfaces on flexible or non-flexible partitions in the sanitary sector, examples of partitions of this type being partitions dividing public toilets, partitions of shower cubicles, of swimming pools, or of saunas. and also shower curtains (flexible partition).

FIG. 1 gives a scanning electron micrograph (SEM) of a carrier system with a self-regenerating self-cleaning effect. It is clear that, when the superficial particles are lost, particles lying underneath these take over their function, and the self-cleaning property is therefore retained.

Figure 2:
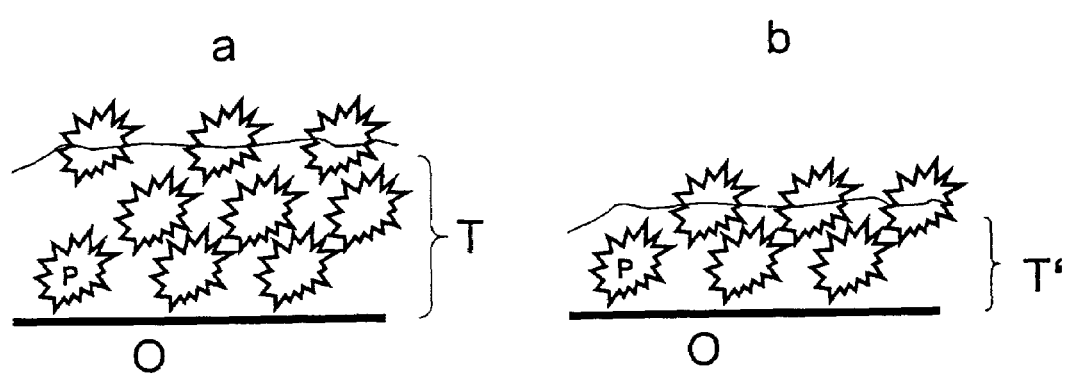
FIG. 2 is a diagram of the mode of operation of the surface of the invention.

FIG. 2 is a diagram of the mode of operation of the surface of the invention. Particles have been secured to the surface O using a carrier T which comprises binder and particles P (a). If this surface is exposed to erosion for a period, the result is a surface O as in (b), with a markedly thinner layer T'. It is clearly seen that the uppermost layer of particles which Were secured by way of the carrier (a) have been ablated by erosion (b), and the structure of the self-cleaning surface is now formed by particles which were previously present within the carrier.

The examples below are intended to give further illustration of the inventive surfaces and, respectively, the process for producing the surfaces, but there is no intention that the invention be restricted to these embodiments.

EXAMPLE 1

20% by weight of methyl methacrylate, 20% by weight of pentaerythritol tetraacrylate, and 60% by weight of hexanediol dimethacrylate were mixed with one another. Based on this mixture, 14% by weight of Plex 4092 F®, an acrylic copolymer from Röhm GmbH, and 2% by weight of UV curing agent Darokur 1173® were added, and the mixture was stirred for at least 60 min. 8.45% by weight of hydrophobicized fumed silica, Aerosil VPR 411® (Degussa AG) were added to this mixture made from binder. with vigorous stirring, and stirring was continued until the particles had been completely and thoroughly mixed with the binder and had been completely wetted by the binder.

This mixture made from binder and particles was applied at a thickness of 50 µm as carrier to a PMMA sheet of thickness 2 mm. Initial drying of the layer was carried out for 5 min. The particles then sprayed on by means of an electrostatic spray gun were hydrophobicized fumed silica, Aerosil VPR 411® (Degussa AG). After 3 min, the carrier was cured under nitrogen at a wavelength of 308 nm. Once the carrier had been cured. excess Aerosil VPR 411® was removed by brushing. Initial characterization of the surface took place visually and was recorded as –++, meaning that there is almost complete formation of water droplets. The roll-off angle was 2.6°.

EXAMPLE 2

The experiment of Example 1 is repeated, but Aerosil R 8200® (Degussa AG), which has a BET surface area of 200 ±25 $m^2/g$, is used instead of Aerosil VPR 411®. The assessment of the surface is +++.

EXAMPLE 3

10% by weight (based on the total weight of the surface coating mixture) of 2-(N-ethylperfluorooctanesulfonamido) ethyl acrylate was also added to the surface coating of Example 1, which had previously been mixed with the UV curing agent. This mixture, too, was again stirred for at least 60 min. This mixture was applied at a thickness of 50 µm as carrier to a PMMA sheet of thickness 2 mm. Initial drying of the layer was carried out for 5 min. The particles then applied by means of an electrostatic spray gun were hydrophobicized fumed silica, Aerosil VPR 411® (Degussa AG). After 3 min, the carrier was cured under nitrogen at a wavelength of 308 nm. Once the carrier had been cured, excess Aerosil VPR 411® was removed by brushing. Initial characterization of the surfaces was carried out visually and recorded as +++, meaning that there is almost complete formation of water droplets. The roll-off angle was 0.5°.

While the present invention has been described with respect to specific embodiments, it is not confined to the specific details set forth, but includes various changes and modifications that may suggest themselves to those skilled in the art, all falling within the scope of the invention as defined by the following claims.

The disclosure of the priority document, German Application No. 101 34 477.5, filed Jul. 16, 2001, is incorporated by reference herein in its entirety.

What is claimed is:

1. An ablatable, self-regenerating coating comprising:
   a carrier;
   first particles that are secured to the carrier after applying the first particles onto the surface of the carrier, and
   second particles;
   wherein the carrier comprises a binder and the second particles are mixed in the binder;
   wherein the binder is made by curing a curable substance using at least one of radiant energy and chemical energy;
   wherein the first particles are agglomerates or aggregates of an inorganic material selected from the group consisting of a silicate, a doped silicate, a mineral, a metal oxide and a silica, reacted with a hydrophobicizing agent;
   wherein the first particles have a fissured structure with an average height of the elevations from 20 to 500 nm and a separation of the elevations and depressions on the particles is below 500 nm; and wherein the total amount of the second particles is from 1 to 15% by weight based on the weight of the carrier.

2. The coating as claimed in claim 1, wherein the binder is made by curing a curable substance wherein said curable substance is at least one selected from the group consisting of monounsaturated acrylates, polyunsaturated acrylates, methacrylates, polyurethanes, silicone acrylates, and urethane acrylates.

3. The coating as claimed in claim 1, wherein the first particles have an average size of less than 50 µm; and the second particles have an average size of less than 50 µm.

4. The coating as claimed in claim 3, wherein the first particles have an average size of less than 30 µm; and the second particles have an average size of less than 30 µm.

5. The coating as claimed in claim 1, wherein the carrier comprises 7.5 to 15% by weight of the second particles based on the carrier.

6. The coating as claimed in claim 1, wherein the binder is ablated more rapidly than the particles present therein.

7. The coating as claimed in claim 1, wherein the hardness of the second particles is greater than the hardness of the binder by 10%.

8. The coating as claimed in claim 1, wherein the hardness of the second particles is greater than the hardness of the binder by 20%.

9. The coating as claimed in claim 1, wherein the hardness of the second particles is greater than the hardness of the binder by 50%.

10. A process for producing an ablatable, self-regenerating, self-cleaning surface, the process comprising:

applying first particles onto a carrier and securing the first particles to the surface of the carrier; and forming the self-regenerating, self-cleaning surface, wherein the carrier comprises a binder and second particles mixed in the binder, wherein the binder is a curable substance that is cured by using at least one of radiant energy and chemical energy;

wherein the first particles are agglomerates or aggregates of an inorganic material selected from the group consisting of a silicate, a doped silicate, a mineral, a metal oxide and a silica, reacted with a hydrophobicizing agent;

wherein the first particles have a fissured structure with an average height of the elevations from 20 to 500 nm and a separation of the elevations and depressions on the particles is below 500 nm, and wherein the total amount of the second particles is from 1 to 15% by weight based on the weight of the carrier.

11. The process as claimed in claim 10, further comprising applying a curable substance to a substrate; and applying the first particles to the curable substance, wherein the securing comprises curing the curable substance to form the binder.

12. The process as claimed in claim 11, wherein the curable substance is at least one selected from the group consisting of monounsaturated acrylates, polyunsaturated acrylates, methacrylates, polyurethanes, silicone acrylates, and urethane acrylates.

13. The process as claimed in claim 12, wherein the first particles and the curable substance both have hydrophobic properties.

14. The process as claimed in claim 10, wherein the first particles and the second particles have hydrophobic properties as a result of treatment with at least one compound selected from the group consisting of alkylsilanes, perfluoroalkylsilanes, and alkyldisilazanes.

15. The process as claimed in claim 10 wherein the first particles are made hydrophobic by treating the first particles with at least one compound selected from the group consisting of alkylsilanes, perfluoroalkylsilanes, and alkyldisilazanes.

16. The process as claimed in claim 10, wherein the self-regenerating, self-cleaning surface is formed as a coating on an article.

17. The process as claimed in claim 16, wherein the article includes a non-rigid surface; and the coating is on the non-rigid surface.

18. The process as claimed in claim 16, wherein the article is selected from the group consisting of toilet partitions, shower partitions, swimming pool partitions, and sauna partitions.

19. The process as claimed in claim 10, wherein the binder is ablatable.

20. The process as claimed in claim 10, wherein the binder is ablated more rapidly than the second particles.

21. The process as claimed in claim 10, wherein the hardness of the second particles is greater than the hardness of the binder by 10%.

22. The process as claimed in claim 10, wherein the hardness of the second particles is greater than the hardness of the binder by 20%.

23. The process as claimed in claim 10, wherein the hardness of the second particles is greater than the hardness of the binder by 50%.

24. A self-cleaning surface comprising a substrate coated with the coating as claimed in claim 1.

25. The self-cleaning surface as claimed in claim 24, having a roll-off angle of less than 20°.

26. The self-cleaning surface as claimed in claim 24, having a roll-off angle of less than 10°.

* * * * *